(12) United States Patent
Reial

(10) Patent No.: US 8,565,706 B2
(45) Date of Patent: Oct. 22, 2013

(54) RAKE RECEIVER AND A METHOD OF ALLOCATING FINGERS IN A RAKE RECEIVER

(75) Inventor: Andres Reial, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 902 days.

(21) Appl. No.: 12/529,185

(22) PCT Filed: Feb. 27, 2008

(86) PCT No.: PCT/EP2008/052331
§ 371 (c)(1),
(2), (4) Date: Oct. 26, 2009

(87) PCT Pub. No.: WO2008/119603
PCT Pub. Date: Oct. 9, 2008

(65) Prior Publication Data
US 2010/0081403 A1 Apr. 1, 2010

Related U.S. Application Data

(60) Provisional application No. 60/909,084, filed on Mar. 30, 2007.

(30) Foreign Application Priority Data

Mar. 29, 2007 (EP) .................................. 07105225

(51) Int. Cl.
*H04B 1/06* (2006.01)
(52) U.S. Cl.
USPC ......... 455/277.1; 455/506; 375/148; 375/261

(58) Field of Classification Search
USPC ....................................................... 455/277.1
See application file for complete search history.

(56) References Cited

U.S. PATENT DOCUMENTS 7,085,310 B2     8/2006   Chen et al.
7,508,863 B2 *   3/2009   Bachl et al. ................... 375/148
(Continued)

OTHER PUBLICATIONS

T. Fujii et al., Rake Received Characteristics Considering Antenna Diversity and Path Diversity for Wideband DS-CDMA System, Electronics & Communications in Japan, Part I—Communications, 2001, pp. 36-54, vol. 84, No. 10, Wiley, Hoboken, NJ.

(Continued)

*Primary Examiner* — Ajibola Akinyemi
(74) *Attorney, Agent, or Firm* — Potomac Patent Group PLLC

(57) ABSTRACT

A RAKE receiver is adapted to receive input from at least a first and a second antenna (104a, 104b). The RAKE receiver comprises a despreading unit (303) adapted to allocate a number ($N_f$) of despreading fingers to a number of delay positions of a signal which is transmitted over a channel. The RAKE receiver further comprises a delay position selection unit (305) which estimates an antenna correlation (formula 1) between the at least first and second antenna (104a, 104b) and controls the despreading unit (303) according to a first strategy for allocating the number ($N_f$) of fingers if the antenna correlation (formula 1) is below a predetermined threshold, and according to a second strategy otherwise. The threshold (formula 2) is selected based on at least one of the following: number of available finger in the RAKE receiver ($N_f$), dispersion of the channel, range of direction of arrivals ($\Delta\phi$).

23 Claims, 3 Drawing Sheets

(56) References Cited

U.S. PATENT DOCUMENTS

| | | | |
|---|---|---|---|
| 7,702,025 B2* | 4/2010 | Sudo | 375/261 |
| 2003/0210670 A1 | 11/2003 | Kisigami et al. | |
| 2004/0218698 A1* | 11/2004 | Jonsson et al. | 375/343 |
| 2004/0229637 A1* | 11/2004 | Wang et al. | 455/506 |
| 2005/0047485 A1* | 3/2005 | Khayrallah et al. | 375/148 |
| 2006/0013290 A1* | 1/2006 | Oura et al. | 375/148 |
| 2006/0203894 A1 | 9/2006 | Ventola | |
| 2006/0256842 A1 | 11/2006 | Ito | |
| 2007/0116100 A1* | 5/2007 | Lindoff et al. | 375/148 |

OTHER PUBLICATIONS

EPO, Int'l Search Report in PCT/EP2008/052331, Jun. 6, 2008.

* cited by examiner

| | | No. of significant paths | | | |
|---|---|---|---|---|---|
| | | 1-2 | 3-6 | 7-10 | 11- |
| Range of DOA | 0-π/4 | 0,8 | 0,75 | 0,65 | 0,5 |
| | π/4- π/2 | 0,9 | 0,8 | 0,75 | 0,6 |
| | π/2- π | 0,95 | 0,9 | 0,8 | 0,7 |
| | π- 2π | 0,98 | 0,95 | 0,9 | 0,8 |

RAKE RECEIVER AND A METHOD OF ALLOCATING FINGERS IN A RAKE RECEIVER

TECHNICAL FIELD

The present invention relates to a RAKE receiver and a method for allocating a number of despreading fingers in a RAKE receiver, which is adapted to receive input from at least a first and a second antenna, to a number of delay positions of a signal transmitted over a channel.

BACKGROUND ART

In wireless communications, the physical channel between the transmitter and the receiver is formed by a radio link. In most cases, many different propagation paths exist between the transmitter and the receiver. This is due to reflections in the environment, e.g. against buildings, and gives rise to a multipath channel with several resolvable components.

The performance of a Code Division Multiple Access (CDMA) receiver is improved if the signal energy carried by many multipath components is utilized. This is traditionally achieved by using a RAKE receiver. A detailed description of RAKE receivers may be found e.g. in the book "WCDMA for UMTS" by Holma, & Toskala, A. (Wiley 2000).

A RAKE receiver includes various 'fingers', or despreaders, each finger having an assigned path delay for receiving a particular image of a multipath signal and a correlator for despreading the received image. In combination, the fingers despread multiple signal images of a received multipath signal, thus mitigating the effect of the multipath channel fading phenomenon.

In other words, in a RAKE receiver, each multipath component is assigned a finger, or despreader, whose reference copy of the spreading code is delayed equally to the path delay of the corresponding multipath component.

The outputs of the RAKE fingers are coherently combined to produce a symbol estimate. Thus, the RAKE receiver requires knowledge of the multipath delays and the values of the channel impulse response for all paths. The best performance is achieved if the signal energy from all paths is utilized.

The combining of the outputs performed by the RAKE receiver improves the signal-to-noise ratio (SNR) since it allows the desired signal components to be summed coherently, while the interference and noise components are summed non-coherently. When the noise components are uncorrelated at each RAKE finger, they partially cancel each other out, while the signal components are rotated so as to sum constructively.

The combining is made by a Maximal-Ratio Combining (MRC) procedure, wherein the different signal components are weighted according to their respective SNR.

An implicit assumption is made in the MRC weight computation process that the noise and interference components on each finger are uncorrelated. The MRC combining produces the best SNR if the RAKE fingers are placed on the strongest paths, i.e. on the delays corresponding to the paths that have instantaneously largest magnitudes at a given time.

On the other hand, it is disadvantageous to place a RAKE finger on a sidelobe of a path that is already covered, since the impairment components would be correlated and no diversity advantage would be gained, as the sidelobe fades together with the main lobe.

In order to improve the RAKE receiver performance, a variety of advanced receiver types have been developed. One such advanced receiver type is the dual-antenna receiver, where the signal is received via two separate antennas, RF (Radio Frequency) and front end processing branches. If the two branches are sufficiently separated (electrically and spatially), the fading processes and the noise and interference signal components on the two branches, as seen by the RAKE receiver, will be substantially uncorrelated.

The dual-antenna RAKE receiver (RAKE2) will then exhibit improved performance, due to the array gain (more signal energy is received) and the diversity gain (reduced probability of deep fades). As a result, the Block Error Rate (BLER) performance of the receiver will be improved.

For the RAKE2 receiver, under the assumption of independent fading and impairment signals, the finger placement is the same as in a single-antenna receiver. The RAKE2 fingers are placed on the strongest paths, without regard to which antenna branch they belong to. For a well-separated multi-branch architecture, this would be the best way of utilizing the available diversity and array gain.

However, for a practical mobile terminal design, the assumptions of independent fading and uncorrelated impairment signals are not always justified. Unfortunately, a number of "cross-talk" mechanisms exist that may introduce significant correlation between the signals of the individual receiver branches.

Firstly, cross-talk may occur due to spatial limitations, i.e. that the two receiver antennas may not be sufficiently separated due to terminal size constraints.

Secondly, electrical coupling may occur when the circuits and conducting surfaces in the mechanical design of the terminal introduce coupling between the signal paths of the receiver branches.

Finally, user body interaction may play a part, since depending on the user hold of the mobile terminal, considerable correlation between the antennas may be introduced that cannot be accounted for in the original design.

All these mechanisms give rise to increased correlation between the effective fading trajectories of the two channels and between the received noise plus interference signal components, as seen by the RAKE2 receiver.

More specifically this means that two RAKE fingers placed at the same delay on the different antennas would no longer experience independent fading and noise plus interference. As a result, the MRC combining would not produce the expected increase in SNR, and may, in fact result in a degradation of the SNR after combining. There are two main reasons for this potential degradation.

Firstly, if the fading is highly correlated, placing more than one finger per fading process (path) makes fewer fingers available to cover other, independent fading processes. This in turn means that the diversity gain is not utilized.

Secondly, if the impairment components on the two fingers are correlated, they accumulate coherently, together with the signal component, which in turn means that the array gain is compromised.

Hence there is a need for a receiver with improved handling of antenna correlation related issues.

SUMMARY

Embodiments of the present invention recognize the fact that the indiscriminate RAKE2 finger placement with up to two fingers per delay may lead to performance degradation, and that it therefore is desirable to find an approach to diversity RAKE combining which accounts for the qualitative change in behavior at high antenna correlations.

Embodiments of the invention alleviate the above mentioned problems by providing a finger placement strategy which adapts to the situation at hand, while not requiring considerable additional complexity in the receiver.

In one embodiment a method of allocating a number of despreading fingers in a RAKE receiver, which is adapted to receive input from at least a first and a second antenna, to a number of delay positions of a signal which is transmitted over a channel comprises the steps of estimating an antenna correlation between the at least first and second antenna, if the antenna correlation is below a predetermined threshold, choosing a first strategy for allocating the fingers to the delay positions, otherwise, choosing a second strategy for allocating the fingers to the delay positions.

The threshold ($\tau$) is selected based on at least one of the following: number of available finger in the RAKE receiver ($N_f$), dispersion of the channel, range of direction of arrivals ($\Delta\phi$).

In another embodiment a RAKE receiver which is adapted to receive input from at least a first and a second antenna, comprises a despreading unit adapted to allocate a number of despreading fingers to a number of delay positions of a signal which is transmitted over a channel, a delay position selection unit adapted to estimate an antenna correlation between the at least first and second antenna, and control the despreading unit according to a first strategy for allocating the number of fingers if the antenna correlation is below a predetermined threshold, and according to a second strategy otherwise.

The threshold ($\tau$) is selected based on at least one of the following: number of available finger in the RAKE receiver ($N_f$), dispersion of the channel, range of direction of arrivals ($\Delta\phi$)).

BRIEF DESCRIPTION OF THE DRAWINGS

The invention will be described more fully below with reference to the drawings, in which.

DETAILED DESCRIPTION OF EMBODIMENTS OF THE INVENTION

To facilitate an understanding of exemplifying embodiments of the invention, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Figures 1, 5:
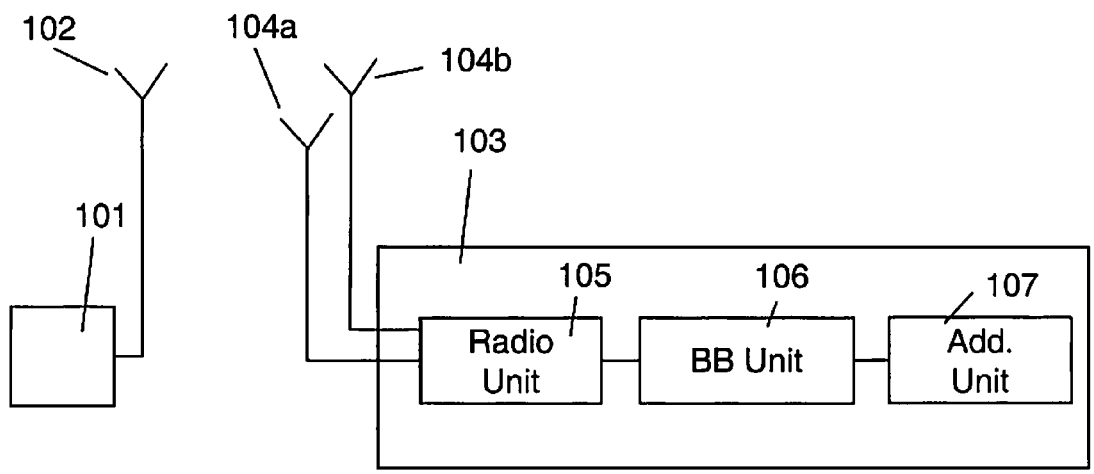
FIG. 1 is a schematic view of a transmitter and receiver arrangement.
FIG. 5 illustrates a look-up table for use in embodiments of the invention.

In FIG. 1 a transmitter 101 is shown, which, via a transmitter antenna 102, transmits a signal. A receiver 103 receives the signal via two receiver antennas 104a and 104b. In the receiver 103, the signals received by the first and the second antenna are first processed in a radio processor or unit 105, then in a baseband processor or unit 106 and then in some additional processor or unit 107. The method according to embodiments of the invention takes place in the baseband unit.

Embodiments of the present invention relates to a multiple antenna RAKE receiver for CDMA where the receive antenna correlation may assume high values. In this disclosure a dual-antenna embodiment is described but the extension to a multiple antenna receiver would from this disclosure be obvious for a skilled person.

Figure 4:
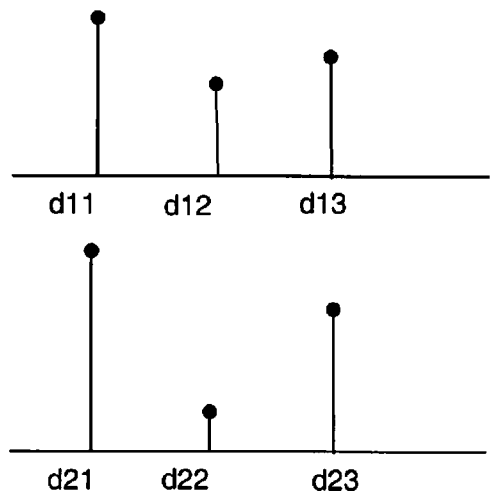
FIG. 4 illustrates a number of delay positions from two antennas.

In FIG. 4, such a RAKE receiver, or at least parts of such a receiver which are relevant to one or more embodiments of the invention is shown. All parts shown within the dashed line square 300 would normally be implemented in the baseband unit 106. As is shown in the figure, the radio unit 105 is connected to a channel estimation unit 301, a path searcher 302 and a RAKE despreader or despreading unit 303. The RAKE despreader 303 is connected to a RAKE combiner or combining unit 304. The path searcher 302 is connected to the channel estimation unit and to a delay position selection unit 305. The channel estimation unit 301 is also connected to the delay position selection unit 305, which in turn is connected to the RAKE despreader 303.

The path searcher 302 processes the received output from the radio unit to find a Power Delay Profile (PDP) and extract relevant paths, in a manner known to a skilled person. The channel estimation unit 301 produces channel estimates also in a known manner. The channel estimates are input to the combiner 304 together with the despread data from the despreading unit.

In the delay position selection unit, data from the path searcher 302 and the channel estimation unit 301 are processed in order to select a strategy for placing or allocating a number $N_f$ of despreading fingers in the despreading unit 303 on a number of delay positions that are received from the two antennas 104a and 104b through the radio unit 105. The despreading unit then despreads, in a known manner, the data from the radio unit 105 corresponding to the delay positions chosen by the delay position selection unit 305.

The delay positions may be illustrated as in FIG. 4. As an illustrating example, the delay positions d11, d12 and d13 might have been received from the first antenna 104a and the delay positions d21, d22 and d23 from the second antenna 104b. In this case the total number of delay positions equals six. If, for instance, the number of despreading fingers $N_f$ equals three, the receiver will have to choose three of the six delay positions for placing the fingers. According to embodiments of the invention, the current reception conditions are taken into account when choosing which delay positions to use when only a limited number of fingers are available for despreading.

In summary, depending on the instantaneous reception parameters, a finger allocating strategy is applied that is optimal for the conditions.

This means that for "low" antenna correlation, the RAKE fingers should be placed on the paths with largest magnitude, regardless of which receiver antenna they correspond to, or whether one or several fingers are placed on the same delay on different antennas. This may be referred to as an unconstrained placement strategy. For "high" correlation", only one finger per delay should be allowed selecting the antenna with instantaneously higher path magnitude, if possible. This may be denoted as constrained placement.

In the example in FIG. 4, this would obviously yield different results for the different antenna correlations. Assuming "low" antenna correlation and three fingers, one may observe that the delays d11, d21 and d23 would be chosen. Assuming "high" correlation, the delays d21, d12 and d23 would be chosen. As will be discussed later on, the receiver might, for certain reasons, in the case of "high" antenna correlation, choose delays from one antenna only. Then the delays belonging to the—in some sense—strongest, or first, antenna are chosen. The strongest antenna may be defined e.g. as the antenna providing the highest average received SNR or sensitivity.

The appropriate threshold between "low" and "high" correlation is situation-dependent. Factors that lower the threshold are e.g. few available RAKE fingers, strongly dispersive channels, and a narrow range of direction of arrivals. All these parameters, as well as the effective signal correlation value, are available at the receiver or may be estimated. One possible way to implement the method is in the form of a pre-computed table look-up, where the number of the available RAKE fingers determines the table, the number of significant paths in the channel realization the column, and the range of directions of arrival the row. The table entry then provides the threshold value with which the current estimated correlation value is compared, and the appropriate finger placement strategy is applied.

The details of estimating the required parameters and formulating the decision process are described below.

Regarding the number of RAKE fingers $N_f$, this is known from the design, or determined based on the use case and receiver configuration. It may be noted that no mathematical estimation process is required for this.

The number of significant paths is determined using the Power Delay Profile (PDP) of the channel, preferably with a 1-chip resolution. This shows the number of paths that strongly contribute to the dispersiveness. To that end, the number of peaks that significantly exceed the noise floor (e.g. their power is at least 10 times that of the noise floor) may be counted. Alternatively, the path searcher 302 may be configured to report the number of paths and this may be taken as a simple measure of the richness of the channel.

To estimate the range of direction of arrivals (DOA), the following approach is used. For each path, the DOA may be estimated as $\hat{\phi}_n = \angle \hat{\rho}_n$. $\hat{\rho}_n$ is the per finger antenna correlation which is described in more detail below.

The range may then be determined as $$\Delta\phi = \min(|\max\{\hat{\phi}_n\}_n - \min\{\hat{\phi}_n\}_n|, |\max\{\hat{\phi}'_n\}_n - \min\{\hat{\phi}'_n\}_n|),$$

with $\hat{\phi}'_n = \mod(\hat{\phi}_n + \pi, 2\pi)$, where only the paths with a non-negligible correlation magnitude are taken into account, $|\hat{\rho}_n| > \partial$. The threshold is chosen empirically, e.g. $\partial = 0.1 \cdot \max(|\hat{\rho}_n|)$. Assuming that the observation period K is sufficiently long to get a low-variance estimate, but not too long for the angle to change, this simple estimate will work. A number of more complex methods may also be proposed that use the statistics of the distribution of $\hat{\phi}_n$.

Finally, the antenna correlation is estimated in the following manner: Let there be $N_p$ physical path delays and 2 antennas. Denote the channel estimate for delay n (n=0 ... $N_p$-1), antenna a(a=0,1), and slot k(k=0 ... K-1) as $c_{n,k}^{(a)}$. The antenna correlation $\hat{\rho}$ may be estimated as $$\hat{\rho} = \frac{1}{N_P} \sum_{n=0}^{N_P-1} |\hat{\rho}_n|,$$

where the per-finger correlation $\hat{\rho}_n$ is $$\hat{\rho}_n = \frac{1}{K} \frac{1}{\sqrt{E|c_{n,k}^{(0)}|^2 E|c_{n,k}^{(1)}|^2}} \sum_{k=0}^{K-1} c_{n,k}^{(0)} c_{n,k}^{(1)*}$$

and, since the channel coefficients have 0-mean, $$E|c_{n,k}^{(a)}|^2 = \frac{1}{K-1} \sum_{k=0}^{K-1} c_{n,k}^{(a)} c_{n,k}^{(a)*}.$$

Since the correlation properties change slowly compared to fading, the measurement period K may be chosen long (e.g. the order of several seconds). For the same reason, "block sums over K" may be stored for the purpose of updating the moving average process, to avoid storing all correlation products over K slots.

Variations may be applied to all these estimation methods, without changing the underlying idea.

Figure 2:
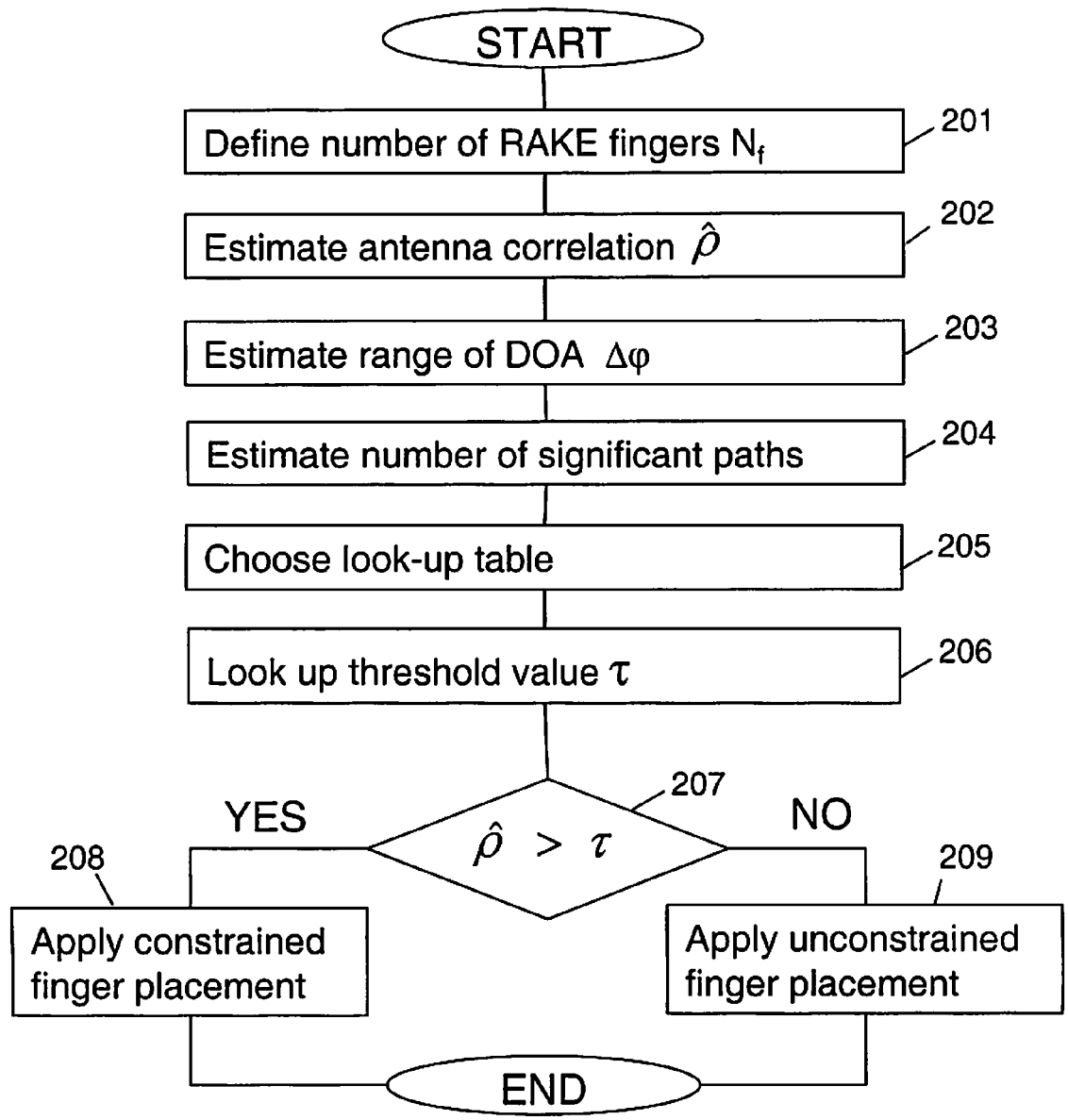
FIG. 2 shows a flow diagram of a method according to an embodiment of the invention.
Figure 3:
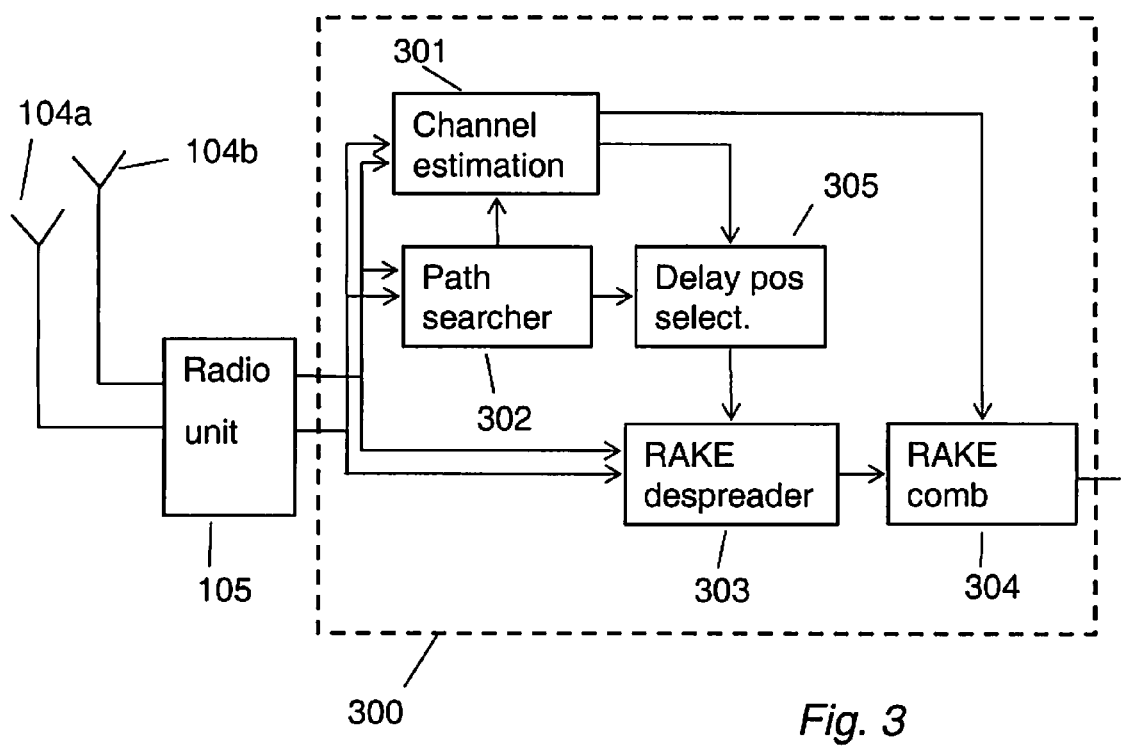
FIG. 3 shows a receiver in accordance with embodiments of the invention.

Referring to FIG. 2, once the number of RAKE fingers $N_f$ is determined in step 201 and the correlation $\hat{\rho}$ is estimated in step 202, the range of the DOA $\Delta\phi$ in step 203 and the number of significant paths is estimated in step 204, an appropriate table is chosen in step 205. Hereafter, the threshold value $\tau$ is determined in step 206 and the estimated correlation $\hat{\rho}$ is compared to the threshold value $\tau$ in step 207. If the correlation $\hat{\rho}$ is smaller than the threshold value $\tau$, the NO path is taken and a first, or unconstrained, placement strategy is applied in step 208. If the correlation $\hat{\rho}$ is larger than the threshold value $\tau$, the YES path is taken and a second, or constrained, placement strategy is instead applied in step 209.

As an example, the choice of table could be based on $N_f=6$ RAKE fingers being available and the chosen table could look like that depicted in FIG. 5. Here, supposing that the estimated DOA range is $\Delta\phi=50$ degrees, the estimated number of paths is 8, and the estimated antenna correlation is $\hat{\rho}=0.8$, a constrained finger placement method would be applied, since the estimated correlation exceeds the threshold value of $\tau=0.75$.

The threshold values for the table entries may be pre-determined off-line, e.g. based on simulated or measured RAKE performance in the relevant scenarios, using the candidate finger placement approaches.

The process of selecting an appropriate strategy needs to be executed relatively seldom, e.g. the order of once a few seconds.

The correlation threshold values in FIG. 5. are merely examples, and should not be interpreted as exact values for an implementation. Also, the chosen ranges of DOA and numbers of paths are only exemplary. The structure of the tables may also be changed without changing the spirit of the invention. Different quantities may of course be used to label the tables, rows, and columns, and additional parameters may be added, without deviating from the fundamental idea of the invention.

The constrained and unconstrained finger placement strategies may be applied to both instantaneous channel magnitude-based and average PDP-based placement processes.

In the first case, the channel estimates for all delay position on both antennas are first computed. Then, for the unconstrained placement option, the delay positions are sorted in a descending order according to their channel estimate magnitudes, irrespective of which antenna they belong to. The $N_f$ largest magnitudes are then selected and the fingers are placed on the corresponding delay positions and antennas.

In case the constrained option is used, the delay positions are first reviewed and if, for some delay position, there are corresponding delay positions on both antennas, then the delay position with the lower instantaneous channel estimate magnitude is removed from the list. The remaining delay positions are then sorted and the fingers are placed on the $N_f$ largest remaining delay positions.

However, in some RAKE implementations, fast finger selection based on the current channel estimates is not possible, due to hardware limitations. In that case, the finger placement may be based on the long-term average path strengths.

In that case, for the unconstrained option, the delay positions are instead sorted by the average signal strength. The average signal strength is the same for two delay positions on different antennas that correspond to the same input path. Then the $N_f$ delays having the strongest average signal strengths are selected and the fingers are placed on these delays. Since the average signal strength is the same for pairs of delay positions, this option could also be described as: the delays corresponding to the $N_f/2$ strongest average signal strengths are selected, and the RAKE2 fingers are placed these delays on both antennas.

For the constrained option, the candidate delays are sorted by the average signal strength in the same way. The $N_f$ strongest are selected, and the RAKE2 fingers are placed on those delays on one of the antennas, e.g. the strongest one. The strongest antenna may be known by design or may be determined e.g. by comparing the actual Signal to Noise Ratio (SNR) values per antenna that are measured as part of standard User Equipment (UE) procedures.

It may be noted that the correlation threshold values may depend on whether the instantaneous, i.e. the current channel estimates, or average path strengths are used as placement criteria.

Although reference is here made to a receiver circuit in a mobile station, it should be noted that the algorithms described below may be used at any CDMA receiver, i.e. in a mobile station or a base station, and the transmission may be uplink or downlink.

Thus, the embodiments disclosed herein are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of allocating a number of despreading fingers in a RAKE receiver, which is adapted to receive input paths from at least first and second antennas, to a number of delay positions of a signal which is transmitted over a channel, comprising:
   estimating an antenna correlation between the at least first and second antennas, wherein the antenna correlation is a measure of a statistical relationship between signals respectively received at the at least first and second antennas;
   if the antenna correlation is below a threshold, choosing a first strategy for allocating the fingers to the delay positions; and
   otherwise, choosing a second strategy for allocating the fingers to the delay positions;
   wherein the threshold is selected based on at least one of a number of available fingers in the RAKE receiver, a dispersion of the channel, and a range of directions of arrival of the input paths; and the second strategy comprises identifying pairs of corresponding delay positions among the delay positions from the at least first and second antennas, eliminating the delay position with the smallest signal strength in each such pair, and allocating the fingers to the delay positions having the largest signal strengths among the remaining delay positions from the at least first and second antennas.

2. The method of claim 1, wherein the first strategy comprises allocating the fingers to the delay positions having the largest signal strengths among the delay positions from the at least first and second antennas.

3. The method of claim 1, wherein the signal strength of a delay position is determined by computing a current channel estimate of the delay position.

4. The method of claim 1, wherein the second strategy comprises allocating the fingers to the strongest delays on only one of the at least first and second antennas.

5. The method of claim 4, wherein the signal strength of a delay position is an average signal path strength of that delay position.

6. The method of claim 1, further comprising selecting the threshold such that the threshold is higher for a higher number of fingers, and lower for a lower number of fingers.

7. The method of claim 1, further comprising determining the dispersion of the channel, and selecting the threshold such that the threshold is lower for a higher dispersion of the channel and higher for a lower dispersion of the channel.

8. The method of claim 7, wherein the dispersion of the channel is determined by determining a number of significant paths of the channel.

9. The method of claim 1, further comprising determining the range of directions of arrival of the input paths, and selecting the threshold such that the threshold is higher for a larger range and lower for a smaller range.

10. The method of claim 1, wherein the threshold is selected from a table.

11. The method of claim 10, wherein the table is predetermined based on simulated or measured receiver performance in at least one scenario.

12. A RAKE receiver which is adapted to receive input paths from at least first and second antennas, comprising:
   a despreading unit adapted to allocate a number of despreading fingers to a number of delay positions of a signal which is transmitted over a channel; and
   a delay position selection unit adapted to estimate an antenna correlation between the at least first and second antennas, and to control the despreading unit according to a first strategy for allocating the number of fingers if the antenna correlation is below a threshold and according to a second strategy otherwise, wherein the antenna correlation is a measure of a statistical relationship between signals respectively received at the at least first and second antennas;
   wherein the delay position selection unit is adapted to select the threshold based on at least one of a number of available fingers in the RAKE receiver, a dispersion of the channel, and a range of directions of arrival the input paths; and the delay position selection unit is adapted, in case the second strategy is selected, to identify pairs of corresponding delay positions among the delay positions from the at least first and second antennas, to eliminate the delay position with the smallest signal strength in each such pair, and to control the despreadinq unit to allocate the number of fingers to delay positions having the largest signal strengths among remaining delay positions from the at least first and second antennas.

13. The RAKE receiver of claim 12, wherein the delay position selection unit is adapted, in case the first strategy is selected, to control the despreading unit to allocate the number of fingers on delay positions having the largest signal strengths among delay positions from the at least first and second antennas.

14. The RAKE receiver of claim 12, wherein the signal strength for a delay position is the current channel estimate for that delay position.

15. The RAKE receiver of claim 12, wherein the delay position selection unit is adapted, in case the second strategy is selected, to control the despreading unit to allocate the fingers to the strongest delay positions on only one of the at least first and second antennas.

16. The RAKE receiver of claim 15, wherein the signal strength of a delay position is an average signal strength of that delay position.

17. The RAKE receiver of claim 12, wherein the delay position selection unit is adapted to select the threshold such that the threshold is higher for a higher number of fingers, and lower for a lower number of fingers.

18. The RAKE receiver of claim 12, wherein the delay position selection unit is adapted to determine the dispersion of the channel, and to select the threshold such that the threshold is lower for a higher dispersion of the channel, and higher for a lower dispersion of the channel.

19. The RAKE receiver of claim 18, wherein the dispersion of the channel is equal to a number of significant paths of the channel.

20. The RAKE receiver of claim 12, wherein the delay position selection unit is adapted to determine a range of directions of arrival of the input paths, and to select the threshold such that the threshold is higher for a larger range and lower for a smaller range.

21. The RAKE receiver of claim 12, wherein the delay position selection unit is adapted to look up the threshold in a table.

22. The RAKE receiver of claim 21, wherein the table is pre-determined based on simulated or measured RAKE receiver performance in at least one scenario.

23. A mobile communication device, comprising a RAKE receiver according to claim 12.

* * * * *

UNITED STATES PATENT AND TRADEMARK OFFICE
CERTIFICATE OF CORRECTION

PATENT NO. : 8,565,706 B2
APPLICATION NO. : 12/529185
DATED : October 22, 2013
INVENTOR(S) : Reial Page 1 of 1

It is certified that error appears in the above-identified patent and that said Letters Patent is hereby corrected as shown below:

In the Specification

In Column 1, Line 26, delete "Holma," and insert -- Holma, H. --, therefor.

In Column 3, Line 36, delete "(Δϕ))." and insert -- (Δϕ). --, therefor.

In Column 5, Line 50, delete " $\hat{\partial}$. " and insert -- $\vartheta$ . --, therefor.

In Column 5, Line 50, delete " $\hat{\partial}$ " and insert -- $\vartheta$ --, therefor.

In the Claims

In Column 8, Line 66, in Claim 12, delete "despreadinq" and insert -- despreading --, therefor.

Signed and Sealed this
Fifteenth Day of July, 2014

Michelle K. Lee
*Deputy Director of the United States Patent and Trademark Office*